(12) United States Patent
Van Brocklin et al.

(10) Patent No.: US 7,110,122 B2
(45) Date of Patent: Sep. 19, 2006

(54) INTERFEROMETER CALIBRATION METHODS AND APPARATUS

(75) Inventors: Andrew L. Van Brocklin, Corvallis, OR (US); Eric T. Martin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 237 days.

(21) Appl. No.: 10/897,238

(22) Filed: Jul. 21, 2004

(65) Prior Publication Data

US 2006/0017934 A1    Jan. 26, 2006

(51) Int. Cl.
*G01B 9/02* (2006.01)
*G02B 27/00* (2006.01)

(52) U.S. Cl. .................. 356/506; 356/519; 359/579

(58) Field of Classification Search ............. 356/480, 356/505, 506, 519; 359/578, 579
See application file for complete search history.

(56) References Cited

U.S. PATENT DOCUMENTS

| | | | |
|---|---|---|---|
| 4,558,950 A | | 12/1985 | Ulrich et al. |
| 4,618,261 A | * | 10/1986 | Flanders et al. ............ 356/505 |
| 4,859,060 A | * | 8/1989 | Katagiri et al. ............. 356/519 |
| 5,550,373 A | * | 8/1996 | Cole et al. .................. 356/519 |
| 5,771,321 A | | 6/1998 | Stern |
| 5,835,255 A | | 11/1998 | Miles |
| 5,986,796 A | | 11/1999 | Miles |
| 6,040,937 A | | 3/2000 | Miles |
| 6,154,591 A | | 11/2000 | Kershaw |
| 6,373,632 B1 | | 4/2002 | Flanders |
| 6,392,341 B1 | | 5/2002 | Jacobsen et al. |
| 6,504,616 B1 | | 1/2003 | Haber et al. |
| 6,542,523 B1 | | 4/2003 | Funakawa |
| 6,674,562 B1 | | 1/2004 | Miles |
| 6,710,908 B1 | | 3/2004 | Miles et al. |
| 6,744,524 B1 | | 6/2004 | Kogan et al. |
| 6,836,366 B1 | * | 12/2004 | Flanders et al. ............ 359/578 |
| 7,002,696 B1 | * | 2/2006 | Miron ........................ 356/519 |
| 2001/0055119 A1 | | 12/2001 | Wood et al. |
| 2002/0015215 A1 | | 2/2002 | Miles |
| 2002/0024711 A1 | | 2/2002 | Miles |
| 2002/0033951 A1 | | 3/2002 | Hill |
| 2002/0036828 A1 | | 3/2002 | Wong |
| 2002/0054424 A1 | | 5/2002 | Miles |
| 2002/0126364 A1 | | 9/2002 | Miles |
| 2002/0126725 A1 | | 9/2002 | Tayebati |
| 2003/0072009 A1 | | 4/2003 | Domash et al. |
| 2003/0098982 A1 | | 5/2003 | McLeod et al. |
| 2003/0165166 A1 | | 9/2003 | Funakawa |
| 2004/0070768 A1 | | 4/2004 | McDaniel et al. |
| 2004/0125281 A1 | | 7/2004 | Lin |

OTHER PUBLICATIONS

Eugene Hecht, "Optics" Fourth Ed., Addison-Wesly, San Francisco, CA (2002), pp. 421-425.

* cited by examiner

*Primary Examiner*—Hwa (Andrew) Lee
*Assistant Examiner*—Patrick J. Connolly (57) ABSTRACT

A method for calibrating an interferometer uses an actuator adapted to control an optical gap in response to application of an electrical signal. The interferometer is illuminated with a beam of light having a predetermined substantially monochromatic wavelength, oriented at a first predetermined angle of incidence, and light reflected from the interferometer at a second predetermined angle is detected while varying an electrical signal applied to the actuator, thereby establishing a calibrated relationship between the applied electrical signal and an optical path length of the interferometer.

41 Claims, 6 Drawing Sheets

INTERFEROMETER CALIBRATION METHODS AND APPARATUS

CROSS-REFERENCE TO RELATED APPLICATIONS

This application is related to co-pending and commonly assigned applications: Ser. No. 10/428,261, filed Apr. 30, 2003 Ser. No. 10/782,488, filed Feb. 18, 2004 and Ser. No. 10/794,636, filed Mar. 5, 2004 the entire disclosure of each of which is incorporated herein by reference.

TECHNICAL FIELD

This invention relates generally to interferometer devices, methods for making such devices, and more particularly to apparatus and methods for calibrating such devices.

BACKGROUND

Micro-electromechanical systems (MEMS) are systems which are typically developed using thin film technology and include both electrical and micro-mechanical components. MEMS devices are used in a variety of applications such as optical display systems, pressure sensors, flow sensors, and charge-control actuators. MEMS devices of some types use electrostatic force or energy to move or monitor the movement of micro-mechanical electrodes, which can store charge. In one type of MEMS device, to achieve a desired result, a gap distance between electrodes is controlled by balancing an electrostatic force and a mechanical restoring force.

MEMS devices designed to perform optical functions have been developed using a variety of approaches. According to one approach, a deformable deflective membrane is positioned over an electrode and is electrostatically attracted to the electrode. Other approaches use flaps or beams of silicon or aluminum, which form a top conducting layer. For such optical applications, the conducting layer is reflective while the deflective membrane is deformed using electrostatic force to direct light which is incident upon the conducting layer.

More specifically, MEMS of a type called optical interference devices produce colors based on the precise spacing of a pixel plate relative to lower (and possibly upper) plates. This spacing may be the result of a balance of two forces: electro-static attraction based on voltage and charge on the plates, and a spring constant of one or more "support structures" maintaining the position of the pixel plate away from the electrostatically charged plate. One known approach for controlling the gap distance is to apply a continuous control voltage to the electrodes, where the control voltage is increased to decrease the gap distance, and vice-versa. However, precise gap distance control may be affected by several factors, including variations in the operating temperatures experienced by the interference device, the voltage applied to the interference device, material variations between support structures and other system variations.

One known method of calibrating an interferometer device is to use analog control circuitry to produce a continuously variable voltage, which is applied to the pixel plate and the electrostatically charged plate of the interferometer device, e.g., a bottom plate. Calibration of the applied voltages corresponding to various colors is done using a color sensor that uses color filters and corresponding photosensors to find the colors of the reflected light.

BRIEF DESCRIPTION OF THE DRAWINGS

The features and advantages of the disclosure will readily be appreciated by persons skilled in the art from the following detailed description when read in conjunction with the drawings, wherein.

DETAILED DESCRIPTION OF EMBODIMENTS

For clarity of the description, the drawings are not drawn to a uniform scale. In particular, vertical and horizontal scales may differ from each other and may vary from one drawing to another. In this regard, directional terminology, such as "top," "bottom," "front," "back," "leading," "trailing," etc., is used with reference to the orientation of the drawing figure(s) being described. Because components of the invention can be positioned in a number of different orientations, the directional terminology is used for purposes of illustration and is in no way limiting. For example, those skilled in the art will recognize that, in the context of the present invention, an interferometer whose "top reflector" is movable relative to a "bottom reflector" is functionally equivalent to another interferometer whose "bottom reflector" is movable relative to a "top reflector."

One aspect of the invention provides embodiments of a method for calibrating an interferometer having first and second reflecting surfaces and an optical gap between them. The method embodiments include steps of providing an actuator adapted to control the optical gap in response to application of an electrical signal, illuminating the interferometer with a beam of monochromatic light at a first predetermined angle of incidence, and detecting light reflected from the interferometer at a second predetermined angle while varying an electrical signal applied to the actuator, thereby establishing a calibrated relationship between the applied electrical signal and an optical path length. Thus, calibration of an interferometer device with such an actuator is accomplished by measuring relative changes in reflected light, using a photosensor and a single wavelength of incident light.

A specific aspect of the invention provides embodiments of an interferometer (e.g., a Fabry-Perot interferometer) with electrostatic actuation of the cavity spacing, in which one or both sides of the actuator plates are split. In some of these embodiments, this splitting may be used to form an integral digital-to-analog converter. This allows the voltage of each section on the bottom plate, for example, to be switched between two predetermined potentials, one of which may be a ground condition (0 volts), and one may be a predetermined non-zero potential, V. If desired, both potentials may be different predetermined non-zero potentials, V' and V".

Another specific aspect of the invention includes embodiments of methods for calibration of a split-plate device. In at least one embodiment, the gap distances controlled by voltages applied to the split plate are related to each other. Thus, in such embodiments also, the calibration with respect to voltage can be accomplished by measuring relative reflection using a photosensor and a single wavelength of light.

Yet another aspect of the invention provides embodiments of a method of using an electrostatic actuator for calibrating an interferometer. Other aspects of the invention include embodiments of interferometer devices and methods for making such devices.

Various aspects of the invention allow calibration of the cavity distance of an interferometer such as a Fabry-Perot device in a finely divided series of steps, without using color filters, multiple color sources, or color-sensing devices. The calibration may be accomplished using a single light source, such as an LED or laser with a substantially monochromatic (single-wavelength) emission, and using a single photosensor.

A physical result of applying a single voltage to the actuator of the device embodiments described herein is an optical gap size. This optical gap size depends on various factors such as spring constant of support structures, plate thickness, and initial gap. These factors can also vary due to variations in temperature, humidity, atmospheric pressure, etc. Thus, even if the effects were strictly linear, the slope and offset of optical gap changes due to switching the voltage on each plate would not be known a priori. Generally, the relationship between optical gap and applied voltage may not be strictly linear, but non-linearity does not prevent accurate calibration of an interferometer by using methods of the present invention.

In a particularly convenient and effective embodiment of the invention, an interferometer has actuator plates for electrostatic actuation of the optical-cavity spacing (optical gap), and one or two sides of the actuator plates are split into two or more segments. This splitting of actuator plates is used to form an integral digital-to-analog converter. That is, the digital-to-analog converter is formed in situ in the interferometer. This allows the voltage on each section of the bottom plate, for example, to be switched in a binary manner between 0V, for example, and a fixed potential relative to the top plate. The plates have areas related by ratios that are powers of two, i.e., ratios of 1, 2, 4, 8, . . . , etc. Permutations of the two binary voltages on each plate section result in relative plate movement that is controlled in a fine series of steps. These steps are obtained by selecting only one of the two binary voltages to apply to each section of the actuator plate. Thus, in an exemplary case of an actuator having four plates with area ratios of 8, 4, 2, and 1, and permutations of potentials expressed correspondingly as ($V_8$, $V_4$, $V_2$, $V_1$), there are sixteen permutations of the two potentials: viz., (0, 0, 0, 0), (0, 0, 0, V), (0, 0, V, 0), (0, 0, V, V), (0, V, 0, 0), (0, V, 0, V), (0, V, V, 0), (0, V, V, V), (V, 0, 0, 0), (V, 0, 0, V), (V, 0, V, 0), (V, 0, V, V), (V, V, 0, 0), (V, V, 0, V), (V, V, V, 0), and (V, V, V, V). Each of these permutations provides a distinct optical cavity spacing. As mentioned above, instead of the 0 volts and V volts of this example, both potentials may be different predetermined non-zero potentials, V' and V".

Again, as with a single-plate actuator, calibration of an interferometer device with such a split-plate actuator is accomplished by measuring relative changes in reflected light, using a photosensor and a single wavelength of incident light. The optical gap distances controlled by the voltage applied to the split-plate actuator are related to each other. The voltages on the split-plate segments may be set to a desired nominal setting for the wavelength of interest. Then the plate voltage may be swept to maximize the irradiance of light reflected onto the photosensor.

Thus, split-plate interferometer devices have the capability of accurately controlling changes in gap size using a single control voltage. This action is similar to that of a conventional digital-to-analog converter (DAC) dividing down a reference voltage or current normally used by DACs and thus producing a desired fraction of the reference current or voltage.

The overall gap voltage can be calibrated by using a single-wavelength light source, such as a semiconductor diode laser, and a simple silicon-diode light sensor. Since the wavelength of such a laser, depending on its own internal cavity length and the type of semiconductor used in its manufacture, is typically known to within +/−5 nm (nanometers), the known wavelength can be used as a reference with respect to detection of a peak in irradiance of light reflected towards the silicon light sensor from the interferometer.

Referring to the drawings, specific apparatus and method embodiments will be described in the following detailed description.

Figure 1:
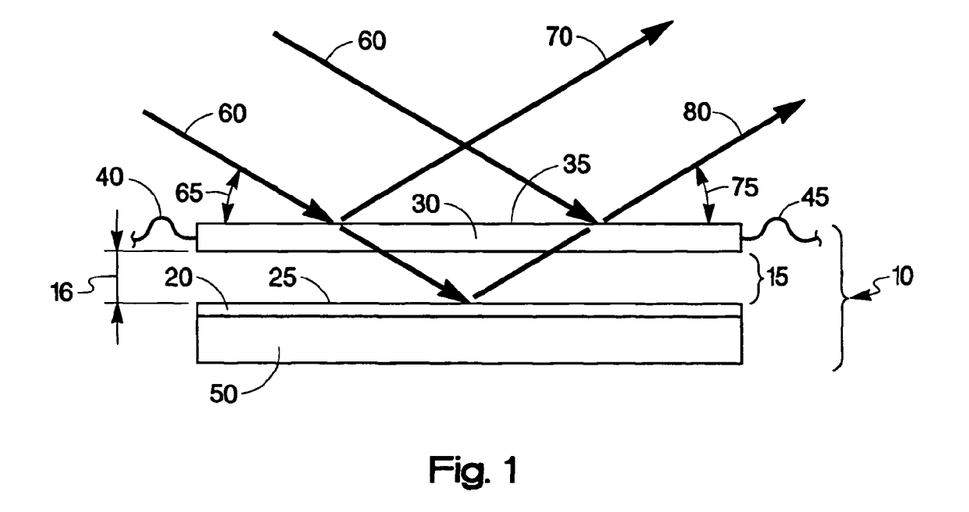
FIG. 1 is a schematic side-elevation cross-sectional view of an embodiment of an interferometer device.

FIG. 1 is a side-elevation cross-sectional view of an embodiment schematically illustrating an interferometer device 10 to which the present invention is applicable. This embodiment is an example of a type of interferometer commonly known as a Fabry-Perot interferometer. The embodiment shown in FIG. 1 has a lower element 20 with a lower reflecting surface 25 and an upper element 30 with an upper reflecting surface 35. Upper reflecting surface 35 is only partially reflective, allowing a portion of incident light to be transmitted toward lower element 20. Upper element 30 is supported by a supporting structure 40, and in this particular embodiment by a second supporting structure 45. Supporting structures 40 and/or 45 may be flexural supports, for example. The upper and lower elements 20 and 30 are substantially parallel (at least in the absence of an electrical signal to an actuator 50) and are spaced apart to form an optical gap 15. The gap dimension 16 of optical gap 15 is also shown in FIG. 1.

Actuator 50 provides means for controlling the optical gap 15. Actuator 50 may be an electrostatic control plate, for example, responsive to an external electrical input such as a control-plate voltage (not shown in FIG. 1). Other alternative actuator means for controlling the optical gap include magnetic, piezoelectric, thermoelectric, and electromechanical actuators of various known types, for example. While actuator 50 is shown attached to lower element 20 in the embodiment of FIG. 1, it could alternatively be attached to upper element 30 or be attached to both upper and lower elements.

To use the interferometer, incident light rays 60 are directed toward reflecting surfaces 25 and 35, and reflected light rays 70 appear after interference occurring in the interferometer. In FIG. 1, the incident light rays 60 are oriented at an incident angle 65 relative to the interferometer top surface (upper reflecting surface 35). Reflected light rays 70 are oriented at an angle 75 to upper reflecting surface 35. Similarly, reflected light rays 80 are oriented at angle 75 to lower reflecting surface 25. It should be noted that the reference from which angles 65 and 75 are measured in the present specification and drawings is not the conventional reference normal to the surface, but the interferometer top surface (upper reflecting surface 35), itself.

Those skilled in the art will recognize that light rays 60 and 80 would also normally be refracted in accordance with Snell's law while passing through upper element 30, as its refractive index would normally differ from that of the ambient medium and/or any medium in optical gap 15, e.g., air. For simplicity of illustration, such refraction is not shown in the drawings.

Figure 2:
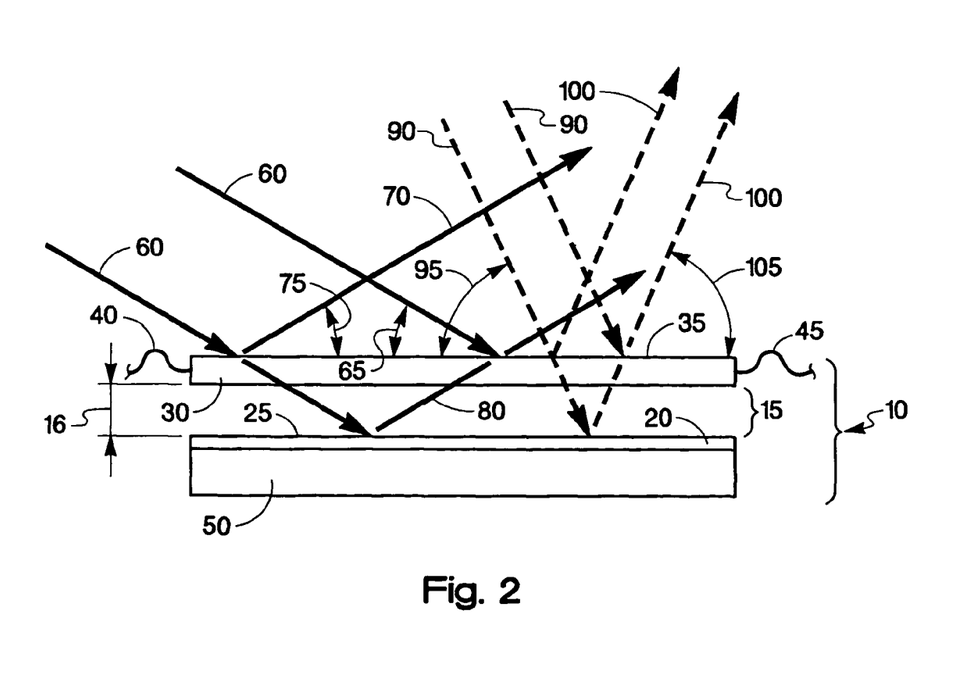
FIG. 2 is another schematic side-elevation cross-sectional view of an embodiment of an interferometer device.

FIG. 2 is another schematic side-elevation cross-sectional view of a similar embodiment of an interferometer device, illustrating two different sets of light rays. On the left side of FIG. 2, incident light rays 60 and reflected light rays 70 and 80 represent monochromatic light used during calibration of the interferometer, incident at predetermined incident angle 65 and exiting at predetermined angle 75. On the right side, incident light rays 90 at angle 95 and reflected light rays 100 at angle 105 show representative light rays during subsequent use of the interferometer after calibration. As shown in FIG. 2, angles 95 and 105 may differ from the predetermined angles 65 and 75 used in calibration. Furthermore, for many applications of interferometer device 10, the light rays 90 incident during use may be polychromatic, and the reflected light rays 100 may be monochromatic in the sense of having a selected hue or dominant wavelength determined by operation of the interferometer device. For example, in use, the incident light rays 90 may consist of white light, and the reflected light rays 100 may be red, green, or blue light in accordance with input applied to actuator 50. Also, in use of the device, the incident and emergent light rays oriented at angles 90 and 100 respectively may include a range of angles and may not necessarily be limited to fixed angles.

Figure 3:
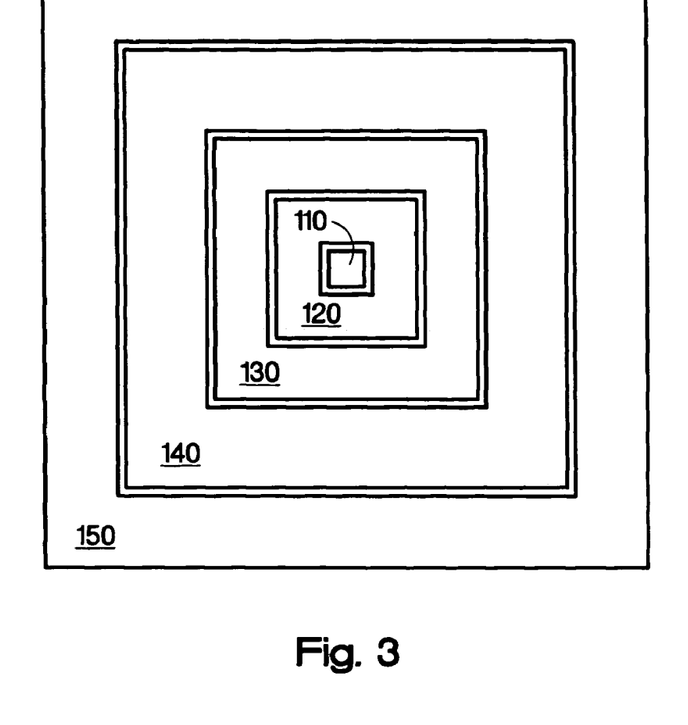
FIG. 3 is a top plan view of a portion of an embodiment of an interferometer device.
Figure 4:
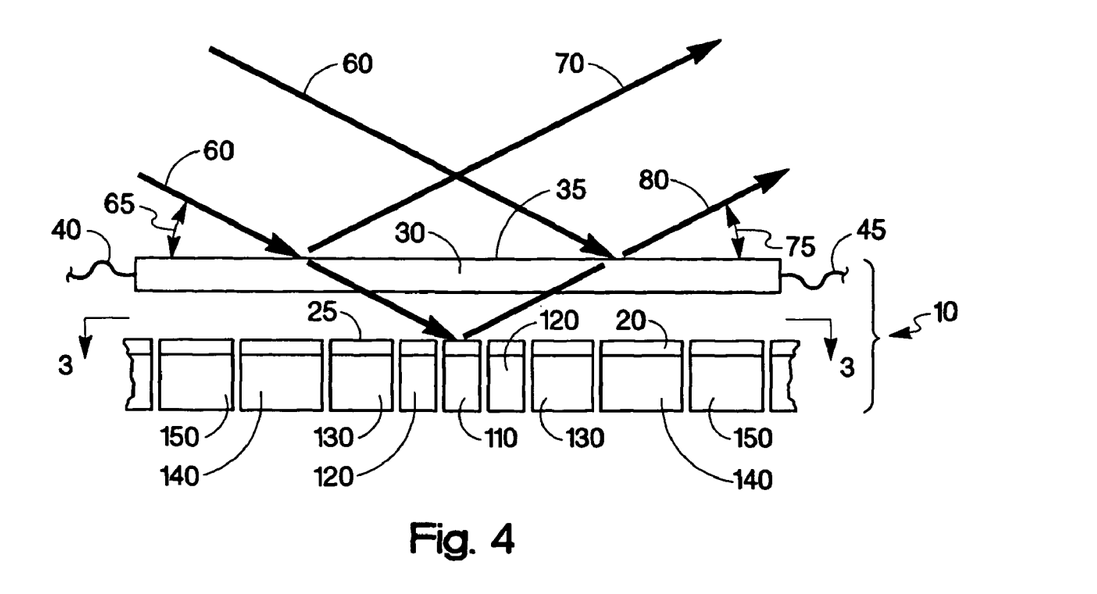
FIG. 4 is a schematic side-elevation cross-sectional view of an embodiment of an interferometer device.

FIG. 3 is a top plan view of a portion of an embodiment of an interferometer device made in accordance with the invention, and FIG. 4 is a schematic side-elevation cross-sectional view of the same embodiment. In the embodiment shown in FIGS. 3 and 4, actuator 50 includes a number of electrostatic control plates 110, 120, 130, 140, and 150. Each electrostatic control plate has a fixed control-plate area. Each control plate is adapted to control the optical gap by application of a separate control-plate voltage, as illustrated hereinbelow. The individual control plates may be substantially coplanar and may be substantially parallel to the first and second reflecting surfaces of the interferometer, as shown in FIG. 4.

In specific embodiments of such an interferometer that are especially useful, the control-plate areas are related by integral ratios, i.e., the fixed control-plate area of each control plate is an integral multiple of a constant. In particular, these integral ratios by which the control-plate areas are related may be powers of two, i.e., ratios of 1, 2, 4, 8, . . . , etc. More generally, for a number N of control plates having this property, the fixed control-plate areas are related by integral ratios of 1, 2, 4, . . . , $2^{N-1}$. For convenience of illustration, the control-plate areas shown in FIG. 3, while illustrating an operable configuration, do not necessarily show ratios that are powers of two. This actuator configuration having split control plates with such ratios forms an integral digital-to-analog converter. Thus, the digital-to-analog converter is formed in situ in the interferometer. This allows the voltage of each section of actuator 50 to be switched in a binary manner between a ground condition (0 V) and a single predetermined non-zero potential.

Another aspect of the interferometer embodiment of FIGS. 3 and 4 is that the electrostatic control plates 110, 120, 130, 140, and 150 are arranged in a nested configuration. Thus, there is an innermost control plate and an outermost control plate, and each control plate except the outermost control plate is surrounded by another control plate. The nested configuration is helpful in preventing instability of the optical gap setting.

Figure 5:
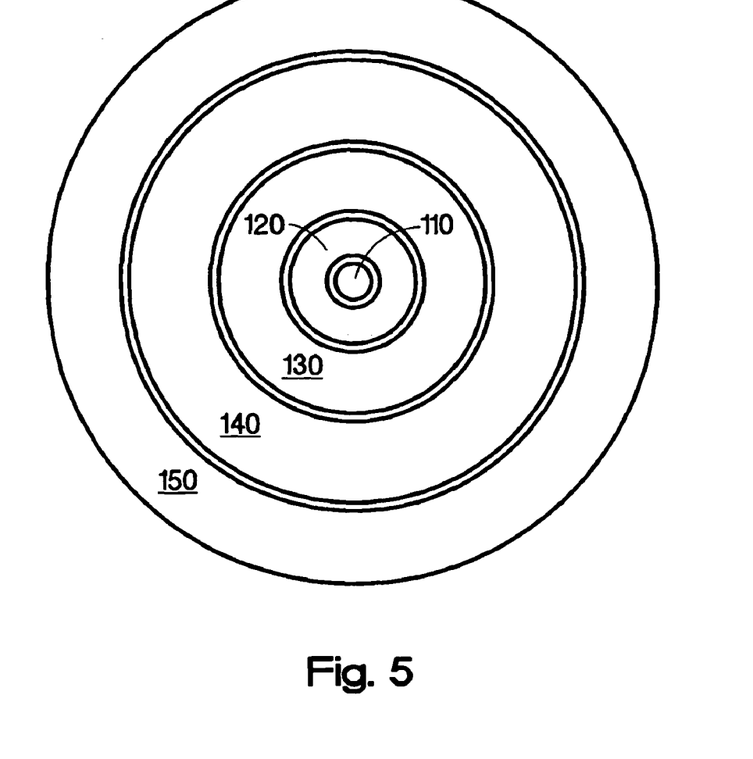
FIG. 5 is a top plan view of a portion of an embodiment of an interferometer device.

FIG. 5, analogous to FIG. 3, is an alternative top plan view of the same portion of the embodiment of FIG. 4. As shown in FIG. 5, the nested arrangement may comprise round control plates. In this configuration there is a round innermost control plate, and each control plate except the round innermost control plate is annular. Other shapes of control plates, nested or un-nested, may also be used.

Figure 6:
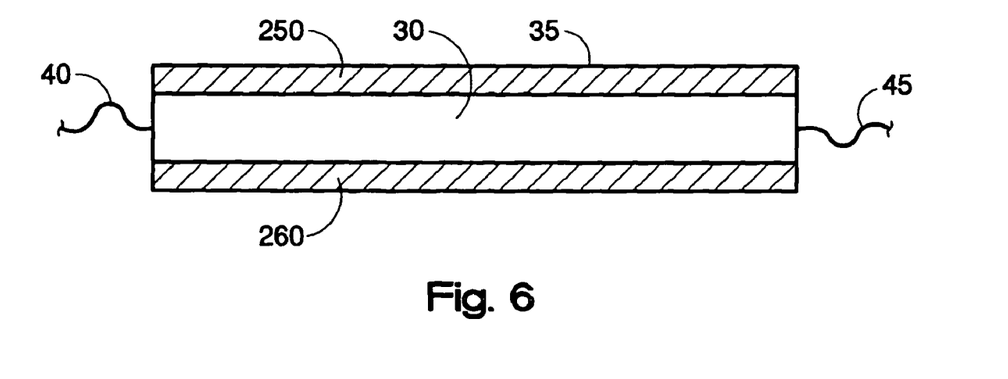
FIG. 6 is a schematic side-elevation cross-sectional view of an embodiment of a portion of an interferometer device.

FIG. 6 is a schematic side-elevation cross-sectional view of an embodiment of a top-element portion 30 of an interferometer device. In this embodiment, top reflecting surface 35 has a film 250 adapted to enhance its (partial) reflectivity. Film 250 may be a stack of layers, each layer having specific desired optical properties so that the entire stack provides the desired reflectivity. Similarly, a film or stack of films 260 may provide anti-reflective properties on the bottom side of top-element 30, e.g., to enhance overall contrast of the interferometer device. Top element 30 may also be made with only one of the films 250 or 260, if desired, by omitting the other film. Many combinations of thin films useful for enhancing or suppressing reflectivity of optical surfaces are known to those skilled in the art.

Figure 7:
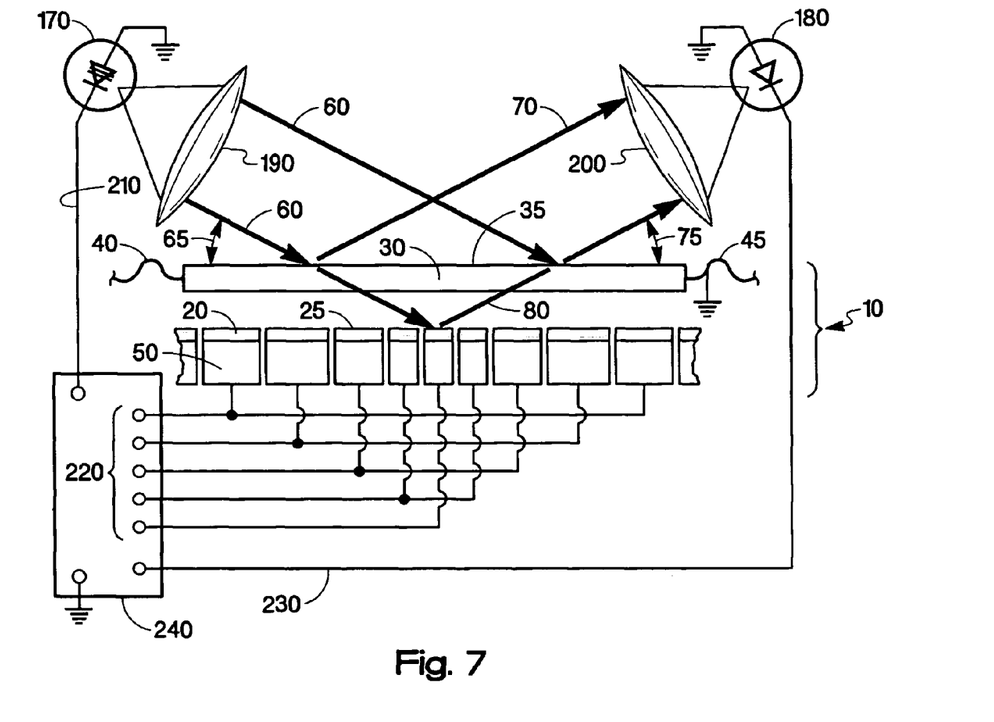
FIG. 7 is a schematic side-elevation cross-sectional view of an embodiment of an interferometer device.

FIG. 7 is a schematic side-elevation cross-sectional view of an embodiment showing optical and electrical aspects of an interferometer device 10 as used during its calibration. To illustrate these aspects of calibration, FIG. 7 shows a device like the embodiment of FIG. 4 with nested split-plate actuator, but various methods of calibration described hereinbelow may also be applied to other device embodiments.

A source 170 of substantially monochromatic light may be used in calibration of the interferometer, e.g., a diode laser or other light-emitting diode (LED) with substantially monochromatic light output. An optical apparatus 190, such as a lens, may be used to direct the monochromatic light in the desired direction of incident light rays 60. Another optical apparatus 200, such as another lens, may be used to direct reflected rays 70 toward a photosensor 180 responsive to the monochromatic light, such as a silicon photodiode, providing a signal proportional to irradiance detected from the interferometer. Support structures 40 and 45 are electrically grounded in the embodiment illustrated.

Figure 8:
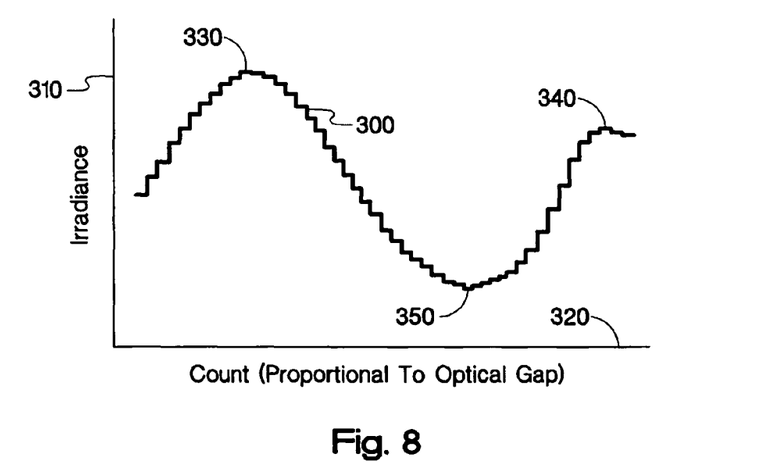
FIG. 8 is a graph showing irradiance detected in an embodiment of a method for calibrating an interferometer.

Source 170 is controlled by an electrical signal 210. The various segments of actuator 50 are driven by individual electrical signals 220, e.g., electrostatic actuator-plate voltages. The electrical output signal 230 of photosensor 180 is read during the calibration. A controller 240 (which may be a programmable computer, such as a general-purpose computer of a conventional type with a memory and suitable inputs and outputs), may be used to apply signals 210 and 220 and to collect, convert analog-to-digital (A-to-D), and store signals 230. Controller 240 may be an embedded controller of a conventional type with an embedded memory, appropriate inputs and outputs, A-to-D conversion, and suitable programming. FIG. 8, showing irradiance detected from the interferometer during calibration, is described hereinbelow in connection with methods of calibrating the interferometer.

Calibration Method

Figure 9:
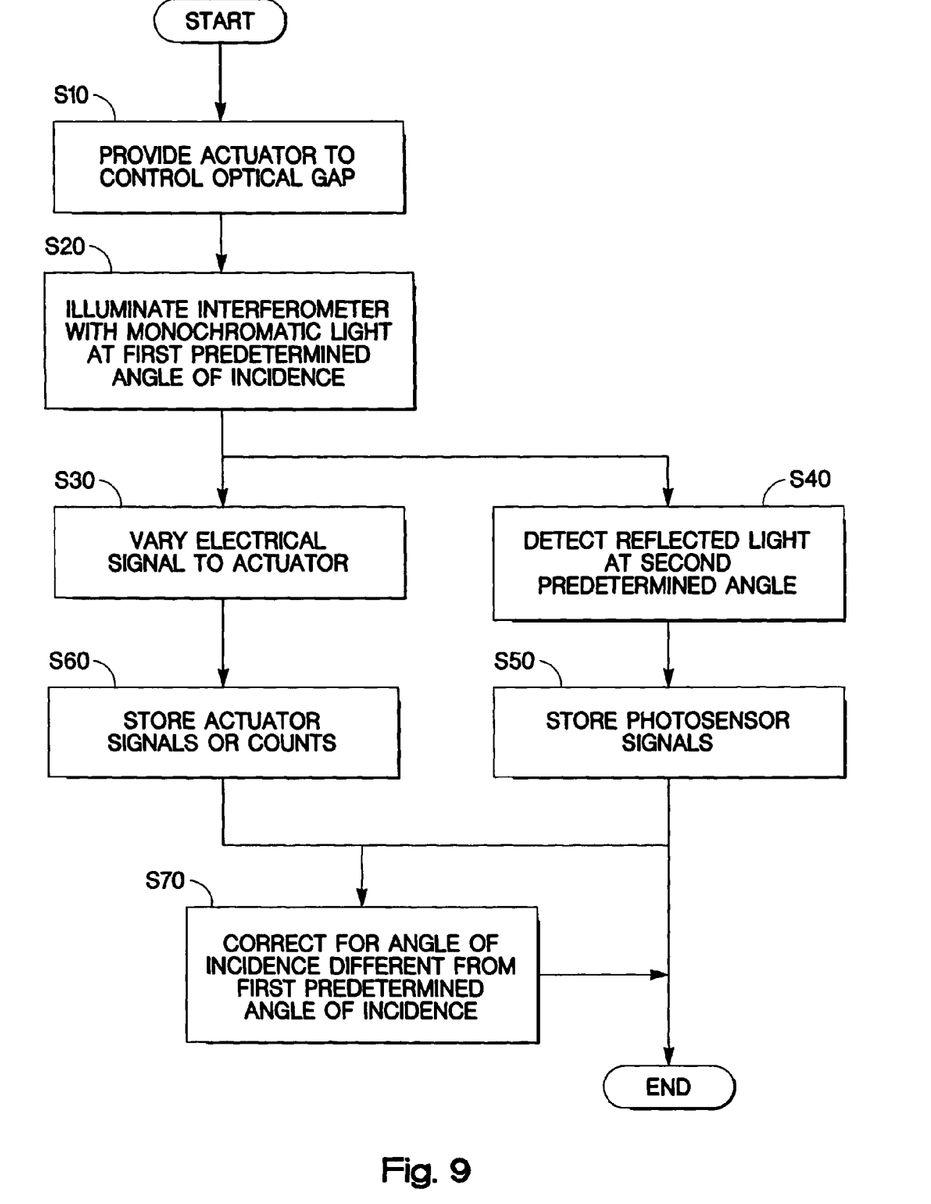
FIG. 9 is a flow chart illustrating an embodiment of a method for calibrating an interferometer.

FIG. 9 is a flow chart illustrating an embodiment of a novel method for calibrating an interferometer, e.g., a Fabry-Perot interferometer. The method is applied to an interferometer having first and second reflecting surfaces and having an optical gap between them, as described hereinabove. Various steps of the method are denoted by reference numerals S10, S20, . . . , S70. Various alternate paths through this method are shown by arrows, but the order of steps may be varied somewhat, and some steps may be performed simultaneously.

The method embodiment of FIG. 9 includes a step S10 of providing an actuator adapted to control the optical gap in response to application of an electrical signal. In step S20, the interferometer is illuminated with a beam of substantially monochromatic light having a predetermined wavelength. The beam is oriented at a first predetermined angle of incidence 65 to the interferometer (i.e., to at least one of the first and second reflecting surfaces). This step of illuminating the interferometer may be performed with a laser (such as a solid-state diode laser) having a single predetermined laser wavelength.

It should be noted again that the reference from which angles 65, 75, 95, and 105 are measured in the present specification and drawings (e.g., in FIGS. 1 and 2) is not the conventional reference normal to the surface, but the interferometer top surface 35, itself, or the parallel surface 25. Those skilled in the art will recognize that this reference is chosen arbitrarily and that the conventional normal reference may be used, provided that suitable geometric changes are made to the claims and to formulas used for corrections.

In step S40, light reflected from the interferometer is detected at a second predetermined angle while varying an electrical signal applied to the actuator (step S30). The step of detecting light reflected from the interferometer may be performed with an electronic photosensor, such a silicon photodiode.

Thus, a calibrated relationship is established between the applied electrical signal and an optical path length of the interferometer, as explained in more detail below. The data for this calibrated relationship is recorded by step S50 of storing the photosensor signals and by step S60 of storing the corresponding actuator signals or the digital counts that determine the actuator signals, as described above. The calibrated relationship between the applied electrical signal and an optical path length of the interferometer may be a non-linear relationship. The calibrated relationship between the applied electrical signal and an optical path length of the interferometer is determined from at least one set of values of the applied electrical signal and at least one corresponding set of values of the photosensor signal, taking into account the known wavelength of monochromatic light.

When the interferometer is used subsequent to calibration, as described above in relation to FIG. 2, the subsequently incident light may have at least one angle of incidence 90 that differs from the predetermined angle of incidence 65. In step S70, the calibrated relationship is corrected, if necessary, for the difference in angles of incidence between calibration and use.

In such cases, the calibrated relationship is corrected in accordance with the formula $$L_{\textit{eff-use}} = L_{\textit{eff-cal}} (\sin A / \sin B)$$

where A is the first predetermined angle of incidence 65 (used in calibration), B is the second predetermined angle of incidence 95 (occurring in use of the interferometer device), $L_{\textit{eff-use}}$ is the effective optical cavity length during use, and $L_{\textit{eff-cal}}$ is the effective optical cavity length during calibration. Angles A and B of this formula are shown with reference numerals 65 and 95 respectively in FIG. 2. Again, after such corrections of the calibration, the calibrated relationship between the applied electrical signal and an optical path length of the interferometer may be a non-linear relationship.

Another difference mentioned above between conditions during calibration and conditions during use is that, while monochromatic light is used in calibration, the subsequently incident light during use may be polychromatic (i.e., not monochromatic). In such cases, the subsequently incident polychromatic light is nevertheless subject to the calibrated relationship between the applied electrical signal and optical path length of the interferometer. Although the incident light may be polychromatic, the light reflected from the interferometer is substantially monochromatic.

The method of FIG. 9 and its various embodiments may, of course, be used with an interferometer having an electrostatic actuator comprising a number of control plates, each having a fixed control-plate area and each being adapted to control the optical gap by application of a control-plate voltage.

The electronic photosensor used for detecting light reflected from the interferometer may have an analog output signal, which may be converted by a digital-to-analog converter to a digital photosensor signal. Selected values of the digital photosensor signal may be stored in a memory. The memory may reside in a controller 240 as described above for controlling the applied electrical signal and/or for recording calibration results. As implied above, the controller may be a computer programmed to perform the calibration of the interferometer.

Thus, another embodiment of a method for calibrating an interferometer includes steps of providing an actuator adapted to control the optical gap in response to application of an electrical signal, illuminating the interferometer with a beam of monochromatic light having a predetermined wavelength, the beam being oriented at a first predetermined angle of incidence to at least one of the first and second reflecting surfaces, varying the electrical signal applied to the actuator in a series of discrete steps, while detecting light reflected from the interferometer at a second predetermined angle with a photosensor having an analog photosensor output, converting the analog photosensor output to a digital photosensor signal, storing a digital value of a digital photosensor signal corresponding to each discrete step of the electrical signal applied to the actuator, and calculating an optical path length corresponding to each discrete step of the applied electrical signal, thereby establishing a calibrated relationship between the applied electrical signal and optical path length of the interferometer. Again, the calibrated relationship may be corrected for application to subsequently incident light having at least one angle of incidence differing from the first predetermined angle of incidence used during calibration.

Another embodiment of a calibration method uses a split-plate actuator. This method includes steps of providing an electrostatic actuator having a number of control plates (each control plate having a fixed control-plate area and being adapted to control the optical gap by application of a control-plate voltage), illuminating the interferometer with monochromatic light, and detecting light reflected from the interferometer while selectively applying a fixed voltage to each control plate, thereby establishing a calibrated relationship between the applied control-plate voltage and an optical path length of the interferometer. As described above, the control plates may be substantially coplanar and may be substantially parallel to the first and second reflecting surfaces of the interferometer.

Another calibration method embodiment that is notably efficient and effective includes steps of providing an electrostatic actuator having a number N of control plates, each control plate having a fixed control-plate area and each control plate being adapted to control the optical gap by application of a control-plate voltage, the N control plates having fixed control-plate areas related by integral ratios of 1, 2, 4, . . . , $2^{N-1}$, illuminating the interferometer with monochromatic light, and detecting light reflected from the interferometer while selectively applying a fixed voltage to each control plate of the N control plates, thereby establishing a calibrated relationship between the applied control-plate voltage and an optical path length of the interferometer.

In this embodiment, then, the fixed control-plate area of each control plate is an integral multiple of a constant, and the fixed control-plate areas of the control plates are related to each other by integral ratios that are powers of two. For various applications, simple arrangements may be used, such as two control plates having fixed control-plate areas related by integral ratios of 1 and 2, three control plates having fixed control-plate areas related by integral ratios of 1, 2, and 4, or four control plates having fixed control-plate areas related by integral ratios of 1, 2, 4, and 8. For an example with more finely controlled optical path lengths, N=6 plates may be used, with integral ratios of 1, 2, 4, 8, 16, and 32. For N=8 plates, the ratios are 1, 2, 4, 8, 16, 32, 64, and 128. Versions with up to at least 24 plates are practical, providing 24 bits of optical-path-length resolution.

All of the method embodiments may be practiced with an interferometer having its control plates disposed in a nested configuration as described above and shown in FIGS. 3 and 5.

FIG. 8 is a graph showing irradiance detected in an embodiment of a method for calibrating an interferometer, performed in accordance with the invention. Irradiance detected by photosensor 180 is plotted parallel to vertical axis 310 for various values of a digital count proportional to the optical gap plotted parallel to horizontal axis 320. The plotted curve 300 exhibits discrete steps in irradiance due to discrete steps in actuator motion produced by an actuator like those of FIGS. 3, 4, 5, and 7 with an integral digital-to-analog converter (DAC) formed by the control-plate arrangement. The curve has two relative maxima, 330 and 340 where the optical path lengths for two different orders of interference correspond to maximum reinforcement between light waves reflected from upper and lower reflecting surfaces 25 and 35. The relative minimum 350 of curve 300 occurs where the corresponding optical path length produces maximum cancellation due to interference at an odd integral number of quarter-wavelengths of the monochromatic light used in calibration. The corresponding optical path lengths for points 330, 340, and 350 are thus determined from the known wavelength of the monochromatic light used in the calibration. As mentioned above, typically this wavelength is known to +/−5 nanometers (nm). Those skilled in the art are familiar with calculations to determine optical path lengths from suitable irradiance data obtained with a known wavelength (see, e.g., the textbook by Eugene Hecht "Optics" Fourth Edition, Addison-Wesley, San Francisco, Calif., 2002, pp. 421–425).

Figure 10:
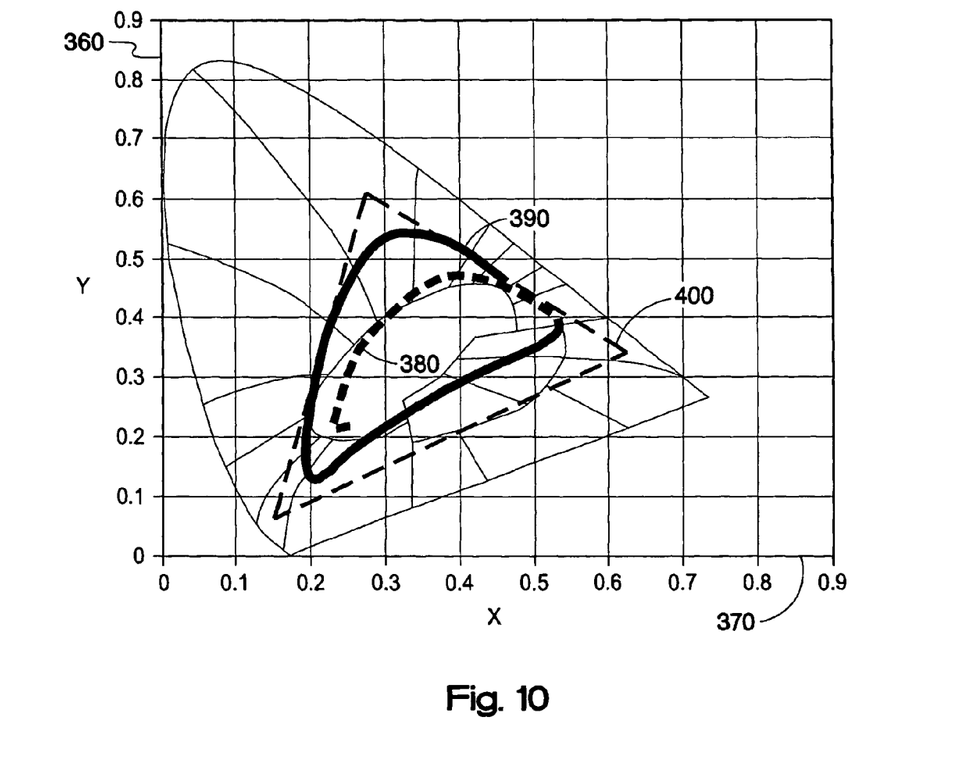
FIG. 10 is a 1931 CIE chromaticity diagram illustrating exemplary results of calibrating an interferometer.

FIG. 10 is a 1931 CIE chromaticity diagram illustrating exemplary results of calibrating an interferometer by embodiments of methods performed in accordance with the invention. For comparison, triangle 400 is shown enclosing chromaticity values from a conventional cathode ray tube RGB display. Dashed curve 380 (first order) and solid curve 390 (second order) trace the chromaticity values for first-order interference and second-order interference for white polychromatic incident light. The parameter that varies along these curves is the optical path length as determined in the calibration methods described above.

Thus, another aspect of the invention is an embodiment of a method of using an electrostatic actuator having a number of control plates for calibrating an interferometer having first and second reflecting surfaces and an optical gap between them. Such a method embodiment includes steps illuminating the interferometer with monochromatic light, controlling the optical gap by selectively applying a fixed voltage to each control plate, and detecting light reflected from the interferometer, thereby establishing a calibrated relationship between the applied control-plate voltage and an optical path length of the interferometer.

Methods for fabricating an interferometer device in accordance with this invention, for fabricating arrays of such devices, and for fabricating an optical interference pixel display including Fabry-Perot interferometer elements are described in the co-pending and commonly assigned applications incorporated by reference hereinabove.

INDUSTRIAL APPLICABILITY

Devices made in accordance with the invention and methods performed in accordance with the invention are useful in calibration for interferometry and in calibration of devices used for display of information, for example. The devices and methods allow calibration of a Fabry-Perot device with a finely divided series of steps in the cavity distance, without using color filters or color-sensing devices. The calibration may be accomplished using a single light source, such as an LED or laser with a substantially single-wavelength emission, and a single photosensor. Thus, these methods can be used to make an all-digital chip whose interferometer devices may be calibrated using only a single wavelength reference. Optical-interference pixel displays may be made using a number of the interferometer devices, arranged in an array, for example. The devices may also be used in other interferometric applications.

Although the foregoing has been a description and illustration of specific embodiments of the invention, various modifications and changes thereto can be made by persons skilled in the art without departing from the scope and spirit of the invention as defined by the following claims. For example, actuators including split actuators and integral-DAC actuators operable by magnetic or piezoelectric or other means may be substituted for the electrostatic actuators illustrated and described. Also, optical elements other than the lenses illustrated, such as mirrors, prisms, or holographic optical elements, may be used to direct incident and/or emergent light. In the methods, the order of steps may be varied for various applications.

What is claimed is:

1. A method for calibrating an interferometer having first and second reflecting surfaces and an optical gap between the first and second reflecting surfaces, the method comprising the steps of:
   a) providing an actuator adapted to control the optical gap in response to application of an electrical signal;
   b) illuminating the interferometer with a beam of substantially monochromatic light having a predetermined wavelength, the beam being oriented at a first predetermined angle of incidence to at least one of the first and second reflecting surfaces;
   c) detecting light reflected from the interferometer at a second predetermined angle to the at least one of the first and second reflecting surfaces while varying an electrical signal applied to the actuator, thereby establishing a calibrated relationship between the applied electrical signal and an optical path length of the interferometer; and d) correcting the calibrated relationship for application to subsequently incident light having at least one second angle of incidence differing from the first predetermined angle of incidence.

2. The method of claim 1, wherein the first and second reflecting surfaces are substantially parallel at least in the absence of an electrical signal to the actuator.

3. The method of claim 1, wherein the interferometer is a Fabry-Perot interferometer.

4. The method of claim 1, wherein the calibrated relationship between the applied electrical signal and an optical path length of the interferometer is a non-linear relationship.

5. The method of claim 1, wherein the calibrated relationship is corrected in accordance with the formula $$L_{\text{eff-use}} = L_{\text{eff-cal}}(\sin A / \sin B)$$

wherein A is the first predetermined angle of incidence, B is the second predetermined angle of incidence, $L_{\text{eff-use}}$ is the effective optical cavity length during use, and $L_{\text{eff-cal}}$ is the effective optical cavity length during calibration.

6. The method of claim 1, wherein the calibrated relationship between the applied electrical signal and an optical path length of the interferometer is a non-linear relationship.

7. The method of claim 1, wherein subsequently incident polychromatic light is subject to the calibrated relationship between the applied electrical signal and an optical path length of the interferometer.

8. The method of claim 7, wherein the light reflected from the interferometer is substantially monochromatic.

9. The method of claim 1, wherein the actuator comprises an electrostatic actuator.

10. The method of claim 9, wherein the electrostatic actuator comprises a plurality of control plates, each control plate having a fixed control-plate area and each control plate being adapted to control the optical gap by application of a control-plate voltage.

11. The method of claim 1, wherein the actuator comprises a plurality of control plates, each control plate having a fixed control-plate area and each control plate being adapted to control the optical gap by application of a control-plate voltage.

12. The method of claim 1, wherein the step of illuminating the interferometer with a beam of substantially monochromatic light is performed with a laser having a single predetermined laser wavelength.

13. The method of claim 12, wherein the laser comprises a solid-state diode laser.

14. The method of claim 1, wherein the step of detecting light reflected from the interferometer is performed with an electronic photosensor.

15. The method of claim 14, wherein the electronic photosensor comprises a silicon photodiode.

16. The method of claim 14, wherein the electronic photosensor has an analog output signal.

17. The method of claim 16, further comprising the step of:
e) converting the analog output of the electronic photosensor to a digital photosensor signal.

18. The method of claim 17, further comprising the step of:
f) storing selected values of the digital photosensor signal in a memory.

19. The method of claim 18, wherein the memory resides in a controller for controlling the applied electrical signal.

20. The method of claim 19, wherein the controller comprises a computer programmed to perform the calibration of the interferometer.

21. The method of claim 18, wherein the calibrated relationship between the applied electrical signal and an optical path length of the interferometer is determined from at least one set of values of the applied electrical signal and at least one corresponding set of values of the digital photosensor signal.

22. A method for calibrating an interferometer having first and second reflecting surfaces and an optical gap between the first and second reflecting surfaces, the method comprising the steps of:

a) providing an actuator adapted to control the optical gap in response to application of an electrical signal;
b) illuminating the interferometer with a beam of substantially monochromatic light having a predetermined wavelength, the beam being oriented at a first predetermined angle of incidence to at least one of the first and second reflecting surfaces;
c) varying the electrical signal applied to the actuator in a series of discrete steps, while detecting light reflected from the interferometer at a second predetermined angle to the at least one of the first and second reflecting surfaces with a photosensor having an analog photosensor output;
d) converting the analog photosensor output to a digital photosensor signal;
e) storing a digital value of a digital photosensor signal corresponding to each discrete step of the electrical signal applied to the actuator;
f) calculating an optical path length corresponding to each discrete step of the applied electrical signal, thereby establishing a calibrated relationship between the applied electrical signal and optical path length of the interferometer; and
g) correcting the calibrated relationship for application to subsequently incident light having at least one second angle of incidence differing from the first predetermined angle of incidence.

23. A method for calibrating an interferometer having first and second reflecting surfaces and an optical gap between the first and second reflecting surfaces, the method comprising the steps of:

a) providing an electrostatic actuator having a plurality of control plates, each control plate having a fixed control-plate area and each control plate being adapted to control the optical gap by application of a control-plate voltage;
b) illuminating the interferometer with substantially monochromatic light; and
c) detecting light reflected from the interferometer while selectively applying a fixed voltage to each control plate of the plurality of control plates, thereby establishing a calibrated relationship between the applied control-plate voltage and an optical path length of the interferometer.

24. The method of claim 23, wherein the interferometer is a Fabry-Perot interferometer.

25. The method of claim 23, wherein the control plates of the plurality of control plates are all substantially coplanar.

26. The method of claim 23, wherein each control plate of the plurality of control plates is disposed substantially parallel to the first and second reflecting surfaces of the interferometer.

27. The method of claim 23, wherein the fixed control-plate area of each control plate is an integral multiple of a constant.

28. The method of claim 27, wherein the fixed control-plate areas of the control plates are related to each other by integral ratios that are powers of two.

29. The method of claim 28, wherein the plurality of control plates comprises two control plates having fixed control-plate areas related by integral ratios of 1 and 2.

30. The method of claim 28, wherein the plurality of control plates comprises three control plates having fixed control-plate areas related by integral ratios of 1, 2, and 4.

31. The method of claim 28, wherein the plurality of control plates comprises four control plates having fixed control-plate areas related by integral ratios of 1, 2, 4, and 8.

32. The method of claim 28, wherein the plurality of control plates comprises a number N of control plates having fixed control-plate areas related by integral ratios of 1, 2, 4, ..., $2^{N-1}$.

33. The method of claim 23, wherein the step of illuminating the interferometer with substantially monochromatic light is performed with a laser having a single predetermined laser wavelength.

34. The method of claim 33, wherein the laser comprises a solid-state diode laser.

35. The method of claim 23, wherein the step of detecting light reflected from the interferometer is performed with an electronic photosensor.

36. The method of claim 35, wherein the electronic photosensor comprises a silicon photodiode.

37. The method of claim 23, wherein the control plates of the plurality of control plates are disposed in a nested configuration.

38. The method of claim 37, wherein the plurality of control plates disposed in a nested configuration includes a round innermost control plate, and each control plate of the plurality of control plates except the innermost control plate is annular.

39. The method of claim 37, wherein the plurality of control plates disposed in a nested configuration includes an outermost control plate, and each control plate except the outermost control plate is surrounded by another control plate.

40. A method for calibrating an interferometer having first and second reflecting surfaces and an optical gap between the first and second reflecting surfaces, the method comprising the steps of:
 a) providing an electrostatic actuator having a number N of control plates, each control plate having a fixed control-plate area and each control plate being adapted to control the optical gap by application of a control-plate voltage, the N control plates having fixed control-plate areas related by integral ratios of 1, 2, 4, ..., $2^{N-1}$;
 b) illuminating the interferometer with substantially monochromatic light; and
 c) detecting light reflected from the interferometer while selectively applying a fixed voltage to each control plate of the N control plates, thereby establishing a calibrated relationship between the applied control-plate voltage and an optical path length of the interferometer.

41. A method of using an electrostatic actuator having a plurality of control plates for calibrating an interferometer having first and second reflecting surfaces and having an optical gap between the first and second reflecting surfaces, the method comprising the steps of:
 a) illuminating the interferometer with substantially monochromatic light,
 b) controlling the optical gap by selectively applying a fixed voltage to each control plate of the plurality of control plates, and
 c) detecting light reflected from the interferometer, thereby establishing a calibrated relationship between the applied control-plate voltage and an optical path length of the interferometer.

* * * * *